United States Patent [19]

Funk

[11] 4,036,627
[45] July 19, 1977

[54] HIGH ANALYSIS FERTILIZER
[75] Inventor: Roger Calvin Funk, Stow, Ohio
[73] Assignee: The Davey Tree Expert Company, Kent, Ohio
[21] Appl. No.: 634,108
[22] Filed: Nov. 21, 1975
[51] Int. Cl.² ............................................. C05C 9/00
[52] U.S. Cl. ...................................... 71/29; 71/64 C
[58] Field of Search .............. 71/28, 29, 64 C, 64 D, 71/64 B, 64 DC; 260/555 R, 555 C

[56] References Cited
U.S. PATENT DOCUMENTS

| | | | |
|---|---|---|---|
| 1,547,732 | 7/1925 | Broadbridge et al. | 71/64 B |
| 2,774,660 | 12/1956 | Cook et al. | 71/64 DB |
| 3,479,175 | 11/1969 | Murphy, Jr. et al. | 71/29 |
| 3,649,598 | 3/1972 | Namioka et al. | 71/28 X |

FOREIGN PATENT DOCUMENTS

| | | | |
|---|---|---|---|
| 555,805 | 4/1958 | Canada | 71/29 |
| 264,406 | 3/1970 | U.S.S.R. | 71/29 |

Primary Examiner—Frank A. Spear, Jr.
Assistant Examiner—Ferris H. Lander
Attorney, Agent, or Firm—A. Yates Dowell, Jr.

[57] ABSTRACT

A high analysis fertilizer formulation of a low bulk density powdered ureaform having soluble and insoluble components combined with soluble monopotassium phosphate in which the resultant mixture is a dry homogeneous blend which is free of fillers and binding agents and may be carried in liquid for application to surface or subsurface areas by conventional liquid fertilizer applying equipment.

3 Claims, No Drawings

HIGH ANALYSIS FERTILIZER

BACKGROUND OF THE INVENTION

1. Field of the Invention

This invention relates generally to fertilizer mixtures of synthetic organic and inorganic materials and particularly to a formulation and method for blending and using monopotassium phosphate with very fine particulate ureaformaldehyde to form a dry homogeneous high analysis fertilizer which may be carried in liquid for application in surface and subsurface spraying and injection fertilization.

2. History of the Prior Art

The use of fertilizer blends of both organic and inorganic material has become recognized as being advantageous in many fertilizer applications. Such blends not only supply nutrients which may be immediately absorbed into the plant root system, but also provide a source of long term nutrient supply.

In order for any nutrient material to be absorbed by a plant root system, it must be dissolved to create various ion structures or salts which are readily attracted and absorbed into the root tissue by an ion exchange process. The inorganic fertilizer material which may include phosphates and potassium are soluble in water and form ions readily when dissolved. Therefore when such fertilizer is supplied to the soil in liquid form, the nutrient ions or salts are immediately available for absorption, or, if a dry inorganic fertilizer is used, the nutrient ions or salts become available as water is percolated through the soil.

Organic fertilizers, those structures which include animal, vegetable and synthetic carbon structures, on the other hand, are advantageous in that they exhibit slower rates of decomposition. That is, organic fertilizer material ordinarily is not readily soluble in water, but only breaks down by microorganism action in the soil to release nutrient ions over a period of time and thus a single fertilizer application may supply nutrients for an extended period. Such organic materials are often referred to as slow release fertilizers.

As mentioned above, organic and inorganic fertilizers may be supplied in either soluble or insoluble form and may either be spread or sprayed onto surface areas or injected or otherwise supplied to subsurface areas. However, when using readily soluble fertilizers, one is limited to the amount of nutrients which may be effectively supplied to the soil without causing damage to plant tissues, a problem commonly referred to as plant or root burn. As the nutrients of the soluble fertilizer are readily dissolved for plant absorption, an excessive amount of salt concentration due to the number of ions released adjacent the root system, may suppress the water absorption by the roots and in some extreme cases may extract moisture from the plant causing the plant to be subjected to a moisture deficiency.

Insoluble fertilizers, on the other hand, must be broken down by either chemical or biodegradable action and thus the rate of salt supply may be reduced somewhat depending upon climatic and soil conditions. Also, insoluble fertilizers having particulate material of a size to be readily blended with soluble material are not readily adaptable to the presently increasing use of pressure or hydraulic fertilizer injection techniques since the particle sizes of the insoluble material must be small enough to allow the fertilizer material to be injected through small bore nozzles.

Subsurface application of fertilizers is recognized as being a highly desirable method by which to provide for the efficient and effective feeding and caring of trees, shrubs and lawns by supplying nutrients directly to the area of the plant roots. Such application has the added advantage, over surface fertilizing, of decreasing the amount of fertilizer runoff or leaching caused by the action of surface waters. Further, pressure or hydraulic injection of fertilizers is a quick and easy method by which to apply fertilizer to subsurface areas without the extra work necessitated by more traditional drill or bore hole techniques.

All nutrient salts or ions are subject to leaching since water dissolves minute quantities of the fertilizer material and such dissolved material commonly moves with the water away from the area of the roots. However, all nutrients do not leach to the same degree. As an example, nitrate salts (which is the form of nitrogen primarily absorbed by plant roots) moves with ground water and rapidly leaches from the root zone while potassium is moderately leached and only a trace of phosphorus is lost. To obtain the joint benefit of liquid injection together with short and long term nutrient release, it is important to provide a mixture of organic and inorganic fertilizer material which, when mixed with water, forms a solution of the inorganic material and a portion of the organic material and forms a suspension of the remainder of the organic material. Normally the dry inorganic material is in granular or pellet form since such material dissolves in water and does not clog the hydraulic equipment. However, due to the necessity of utilizing an organic material which includes very fine or powdery water insoluble particles when using hydraulic injection equipment, problems have been encountered in effecting a uniform blend of dry organic and inorganic fertilizer components in the absence of a liquid medium.

Specifically, in mixing dry synthetic organic material such as ureaformaldehyde, or ureaform, as the requisite particle size is decreased, the more the material exhibits an ability to "flow" because of its low bulk density. That is, as the powdery organic particles are mixed with various inorganic materials in granular or pellet form, they tend to readily separate or settle through the mixture and thus the overall blend is not homogeneous or uniformly mixed. Various prior art methods for effectively dry blending insoluble organic material such as ureaform with soluble inorganic materials have necessitated that the insoluble particle size be approximately the same size as the soluble particles and therefore the insoluble material is not suitable for subsurface injection.

Therefore, to provide the market or consumer with a fertilizer having water soluble inorganic material with very fine particulate water insoluble organic material uniformly suspended therein which could be used for subsurface applications, it has been necessary to blend the organic and inorganic material in a solution. By wet mixing, the problem associated with dry blending was avoided. However, shipping, packaging, consumer handling and other such problems are increased due to the necessity that the fertilizer could only be available as a liquid or slurry.

Some examples of the prior art include U.S. Pat. Nos. 2,864,685 to Waters et al; 3,024,098 to Austin et al; 3,333,940 to Ridgeway; 3,479,175 to Murphy, Jr. et al; and 3,677,736 to Formaini.

SUMMARY OF THE INVENTION

The present invention is embodied in a dry homogeneous high analysis fertilizer blend of a powdered synthetic organic fertilizer material which is of a size to pass at least an 80-mesh sieve and which has an approximate range of 3:1 to 1:1 ratio of water insoluble to water soluble nitrogen and combined with a water soluble inorganic potassium phosphate in a mixture having a ratio of approximately 4:1 respectively.

It is an object of this invention to provide a dry homogeneous fertilizer blend of a synthetic organic fertilizer such as ureaformaldehyde and an inorganic water soluble fertilizer such as monopotassium phosphate which may be handled and shipped as a dry material but which may be mixed with water for use with standard fertilizer injection and spraying equipment.

It is another object of this invention to provide a high analysis fertilizer blend of organic and inorganic materials having a low fertilizer salt index factor so as to avoid possible "burn" damage to plant life.

It is a further object of this invention to provide a dry fertilizer which is capable of being mixed with water for use in subsurface injection to provide localized short and long term nutrients to plant root areas.

It is another object of this invention to provide a long term fertilizer in which the total nutrients available in a single fertilizing application are available over an extended period of time.

DESCRIPTION OF THE PREFERRED EMBODIMENT

One of the more widely used or common sources of organic fertilizer material has been the synthetically manufactured product which contains amounts of nitrogen in both water soluble and water insoluble form. Such fertilizer includes various formulations of ureaformaldehyde or ureaform. This water insoluble nitrogen source is advantageous for use in what may be considered slow release or long term fertilizing. That is, the insoluble nitrogen or components of the ureaformaldehyde form a suspension and not a solution when mixed with water and the nutrient value is therefore not immediately released or available to plant life upon the application of the fertilizer to soil surfaces or subsurfaces.

The ureaformaldehyde is a mixture of unreacted and methylene ureas. The unreacted ureas provide a relatively quick source of nitrogen release as compared to the slower nitrogen release of methylene ureas. The difference in the rate of nitrogen release is due to the fact that the methylene ureas are relatively long chain polymers which require bacterial decomposition to break down their structure and release the nitrogen while the short chain unreacted urea is decomposed more quickly.

In order to develop a fertilizer which provides an initial nitrogen release as well as one which provides for extended nitrogen supply, a ureaformaldehyde is selected which supplies between one-half to three-quarters of its available nitrogen in a slow release form and from between one-quarter to one-half as unreacted urea for immediate absorption. Therefore, the slow to fast nitrogen release ratio which is determined by the ratio of insoluble to soluble nitrogen-releasing compounds, that is, methylene ureas to unreacted ureas, should range between 1:1 to 3:1 respectively.

Although the ratio of slow to fast release nitrogen may vary somewhat, a preferred ureaformaldehyde is selected which supplies approximately two-thirds of its available nitrogen in a slow release form and one-third as unreacted urea which is soluble and therefore available for immediate absorption. By utilizing this 2:1 nitrogen releasing ratio, tests indicate that the breakdown or decomposition of ureaformaldehyde to form soluble nitrogen salts occurs over a period of several years under average soil and moisture conditions. In fact, over a period of the first year, approximately 60% of the insoluble ureaformaldehyde may be decomposed and after several years, amounts of up to 10% of the orginal nitrogen may still be available for ion release for plant absorption. Therefore, this use of ureaformaldehyde enables the long term availability of nitrogen by a one time fertilization process.

It should be noted that if the ratio of slow to fast release nitrogen is increased to 3:1, the amount of nitrogen immediately available for plant absorption is decreased and the percentage of residual nitrogen release over a two year period, as indicated above, is increased. Likewise, a decreased slow to fast release nitrogen ratio to 1:1 decreases the effective residual organic material available to provide for long term nitrogen supplies but makes an increased amount of nitrogen available for immediate plant absorption.

To effectively utilize ureaformaldehyde in conventional fertilizer spraying and subsurface injection apparatus, it is necessary that it be used as a fine powder. The ureaformaldehyde particles must be small enough to pass a standard 80-mesh sieve; however, it is preferred that the major portion of such particles pass a 150-mesh sieve with many passing a 200-mesh sieve, and thus be of a consistency of a fine talc or hydrated lime.

To provide a high analysis fertilizer formulation having immediately available inorganic nutrients, the synthetic organic nitrogen releasing material or compound may be blended with various inorganic compounds to form fertilizer compositions in which the total percent of the nitrogen is equal to or exeeeds 20% and the total percent of the nitrogen, potassium and phosphate nutrients is at least 40% of the overall fertilizer weight.

An example of a high nutrient fertilizer having a low "burn" potential and which is substantially free of fillers and binding agents includes one part monopotassium phosphate in granular or other form which is combined with four parts of a 2:1 slow to fast release ureaformaldehyde in powder form and blended together in a homogeneous mixture. The resultant fertilizer analysis of (30-10-7) is achieved using four parts of a (38-0-0) ureaformaldehyde blended with one part of a (0-52-35) monopotassium phosphate. The actual nutrient percentage of the final (30-10-7) composition varying plus or minus 3%. Therefore the effective percentage of individual nutrients present in the resultant composition may vary between: approximately 29-31% for nitrogen; approximately 9.7-10.3% phosphorous expressed as $P_2O_5$; and approximately 6.8-7.2% soluble potash expressed as $K_2O$.

Again, the ratio of slow to fast release nitrogen may be effectively varied in the final composition by selecting a formulation of ureaformaldehyde having varied ratios of methylene ureas to unreacted ureas.

As discussed above, in order to facilitate the dispensing of the fertilizer product when used in a standard sprayer or injector, it is necessary that the organic material pass an 80-mesh sieve as the insoluble portions thereof will be suspended in a liquid solution when mixed with water for use. Because the monopotassium phosphate is soluble and will therefore form a liquid when mixed with water, there need not be any specific size requirement with regard thereto; although a generally fine to granular size is preferred to insure a more homogeneous mixture.

Blending of the organic synthetic material and the inorganic material is complicated by the fact that ureaformaldehyde of the size required tends to flow or separate from the larger inorganic material when mixed by standard fertilizer blending equipment. However, by utilizing a curved bladed rotary type bulk mixer which operates in much the same manner as a cement mixer, the monopotassium phosphate and ureaformaldehyde were blended in a homogeneous mixture using the above discussed 4:1 compound ratio. Further, the resultant fertilizer blend remained thoroughly mixed even after shipping and handling.

In use, the 30-10-7 fertilizer mixture of ureaformaldehyde and monopotassium phosphate is mixed as described above and shipped to various supply outlets and/or potential users in dry form, thus simplifying product handling and storage as well as reducing the shipping weight. When it is desired to use the product, it is mixed with varying quantities of water depending upon the type of application. Fertilizer strengths which are equivalent to six pounds of nitrogen to each thousand square feet have been safely applied to lawn areas without causing any plant or root burn.

Further due to the fact that the insoluble ureaformaldehyde particles which are suspended in solution when the fertilizer is mixed with water are so small, the fertilizer may be applied to surface or subsurface areas utilizing conventional sprayers and pressure or hydraulic injection equipment without clogging equipment valves and nozzles.

I claim:

1. A dry high analysis fertilizer composition having the nutrients N, P and K comprising organic and inorganic nutrient components, said organic component being a powdered ureaformaldehyde blend, said ureaformaldehyde blend having generally water soluble and water insoluble nitrogen-releasing nutrient compounds, said water insoluble nitrogen-releasing compound being of a size to pass an 80-mesh sieve so that said water insoluble compound may pass through the nozzles of conventional fertilizer spraying and injecting equipment, said water insoluble compound being methylene urea and said water soluble compound being unreacted urea, the ratio of said water insoluble compound to said water soluble compound being approximately one to three parts of methylene urea to one part of unreacted urea, said inorganic component being monopotassium phosphate, said organic and inorganic components being mixed uniformly throughout the fertilizer composition in a ratio by weight of approximately 4:1 respectively, whereby the effective percentage of the nutrients N, P and K are present generally in the range of 29–31% for nitrogen, expressed as N, 9.7–10.3% phosphorus expressed as $P_2O_5$, and 6.8–7.2% soluble potash expressed as $K_2O$.

2. The composition of claim 1 in which said organic component has an approximate ratio of 2:1 of insoluble to soluble nitrogen releasing compounds.

3. The composition of claim 1 in which said water insoluble compound is of a size to pass a 150-mesh sieve.

* * * * *